United States Patent [19]

Cosenza

[11] 4,433,930
[45] Feb. 28, 1984

[54] STUD ASSEMBLY FOR THIN WALLED PANELS

[75] Inventor: Frank J. Cosenza, San Pedro, Calif.

[73] Assignee: Rexnord Inc., Milwaukee, Wis.

[21] Appl. No.: 403,833

[22] Filed: Jul. 30, 1982

[51] Int. Cl.³ .............................................. F16B 5/00
[52] U.S. Cl. ....................................... 403/12; 403/41;
403/17; 403/19; 411/82; 156/91
[58] Field of Search .............. 403/406, 405, 266, 265,
403/41, 12, 11, 17, 19; 411/82, 107, 258;
29/526; 228/135, 140; 156/91; 428/99, 64;
24/304, DIG. 11; 248/205 A

[56] References Cited

U.S. PATENT DOCUMENTS 3,314,465 4/1967 Bien ............................... 403/406 X
3,774,802 11/1973 O'Cheskey ..................... 403/406 X Primary Examiner—Cornelius J. Husar
Assistant Examiner—Joseph A. Fischetti
Attorney, Agent, or Firm—Robert H. Kelly

[57] ABSTRACT

A stud assembly, for securing a nonstructural decorative panel to the interior of an aircraft, includes a threaded shank fixed to one side a flat base, the opposite side of the base having an adhesive applied in a donut fashion, so that, when a nut is tightened on the shank to its proper torque level, the tensile force in the shank allows a dimpling effect in the base but not in the panel.

3 Claims, 4 Drawing Figures

4,433,930

STUD ASSEMBLY FOR THIN WALLED PANELS

BACKGROUND OF THE INVENTION

This invention relates generally to a fastener whose function is to secure a panel to some supporting structure and, more particularly, to an apparatus and method for securing a nonstructural internal decorator panel to an attachment device in the interior of an aircraft.

In aircraft construction it has become increasingly more important to reduce weight, in order to decrease fuel consumption. Reduction in weight can be accomplished in different ways—by using lighter materials, by using fewer components, or by reducing the size of the components. Interior decorator panels can easily be reduced in weight by decreasing the thickness of the panels. When thinner decorator panels are used, however, studs for securing attachment devices thereto can no longer be imbedded in the panel but must be adhesively attached to the side of the panel away from the passengers. When a nut is run up on the adhesively attached stud assembly to lock the assembly to an attachment device, a depression occurs on the passenger side of the panel. This depression or dimpling action occurs due to the nut being tightened and causing a tensile deformation in the stud base, into the adhesive, and finally into the decorator panel.

Thus, from a cosmetic point of view, the indented or dimpled surface in the interior of the aircraft is not desirable, and is especially magnified when the cabin lights along the window area are illuminated.

Accordingly, there exists a need for an apparatus and method for securing a decorator panel to an attachment device in the interior of an aircraft wherein the adhesively bonded stud assembly will not have a dimpling effect on the exterior of the panel when the panel is attached to an attachment device in the aircraft.

SUMMARY OF THE INVENTION

In accordance with the present invention, there is provided a stud assembly that attaches to the back side of the interior decorator panels of an aircraft and a method for attaching these nonstructural panels to the aircraft which, when a nut is run up on the stud to lock the panel to the attachment bracket, the nut will cause indentations in the base of the stud assembly but not on the interior surface of the panels.

The stud assembly, in its preferred form, comprises a threaded shank fixedly attached to one face of a partially ribbed, flexible, circular base member, the threaded shank insertable through an aperture in an attachment device which could be brackets for electrical wiring harnesses, hoses, etc., and which generally has an adjustment clearance to permit radial movement of the threaded shank in the attachment aperture, a layer of adhesive material on the opposite face of the base member, the adhesive material circumscribing the outer perimeter of the opposite face of the base member in a "donut" fashion, and a nut rotatable along the threaded shank which causes movement of the threaded shank in an axial direction away from the decorative panel when the nut is tightened whereby the flexure in the base member and the "donut" effect of the adhesive material allows the dimpling effect in the base member but does not allow the dimpling of the decorative panel.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated an described a preferred embodiment of the invention.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENT

Figure 2:
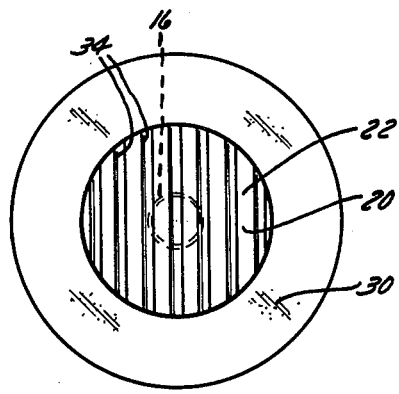
FIG. 2 is a view taken along plane 2—2 of FIG. 1.
Figure 1:
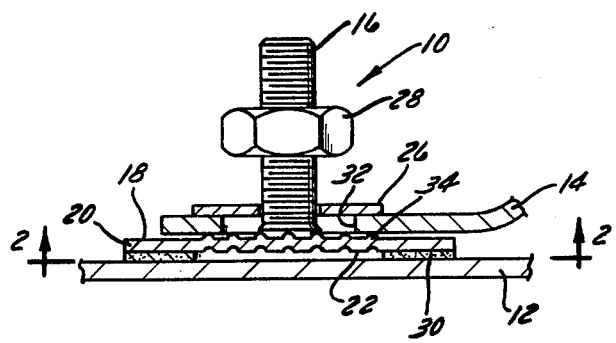
FIG. 1 is a partly sectioned elevation view of a stud assembly adhesively secured to a panel with a nut not tightened.

In accordance with the Figures, the invention comprises a stud assembly 10 for securing a nonstructural panel 12 to an attachment device 14 e.g. brackets, electrical wiring, hoses, etc., on the fuselage of an aircraft. The stud assembly 10, shown in FIG. 1, is composed of any suitable material such as steel, plastic, etc. and has a threaded shank 16, carrying a nut 28 and a washer 26, fixedly attached perpendicular to a face 18 of a substantially circular base 20. The opposite face 22 of the base 20 being coated around its outer perimeter with a layer of adhesive 30 in a "donut" fashion as illustrated in FIG. 2. The base 20 is generally flat where in contact with the adhesive 30, but may have ribs 34 for adding stiffness to the center portion, and is deformable when sufficient force is applied axially along the threaded shank 16. Accordingly, sufficient axially force will cause an indentation 24 in the opposite face 22 of base 20.

Figure 3:
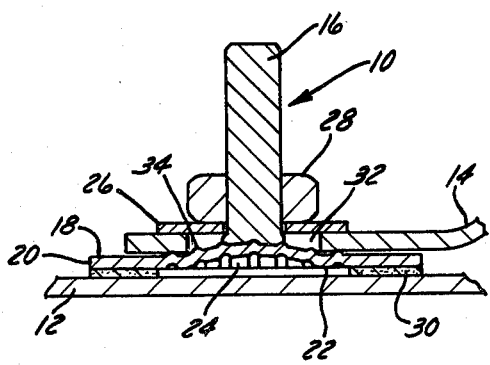
FIG. 3 is a cross-sectioned view of FIG. 1 along the centerline of the shank with the nut tightened to its proper torque level.
Figure 4:
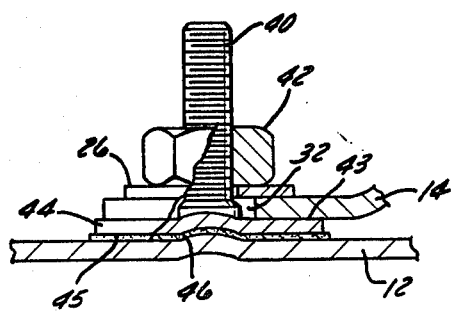
FIG. 4 is a partly broken away and a partly sectioned view of the prior art.

The attachment device 14 has an opening 32 therethrough for receipt of the threaded shank 16 which is large enough to permit radial adjustment between the threaded shank 16 and the opening 32. As illustrated in FIGS. 3 and 4, it is this oversizing or adjustment clearance of the opening 32 which causes the base 20 to dimple when the nut 28 is tightened to its proper torque level.

As illustrated in FIG. 4, the prior art stud assemblies comprised a threaded shank 40 with a nut 42 thereon, the shank 40 being attached to a face 43 of a small, flat base 44, the opposite face 45 of said base 44 being completely coated with an adhesive 46. Since the nonstructural interior decorator panels 12 are thinner than the ordinary panels once used in aircraft, and since the opening 32 in the attachment device 14 is oversized to compensate for misalignment therebetween, when the nut 42 was run on the shank 40 to lock the attachment device 14 in place, a dimpling effect occurred. This dimpling action occurred due to the nut 42 being tightened and causing a tensile deformation in the base 44, into the adhesive 46 and finally into the attached panel 12. This dimpling effect or indentation in the interior panels 12 of the aircraft was not acceptable.

In the present invention, as illustrated in FIG. 3, the dimpled or depressed surface in the interior panel 12 is eliminated by increasing the base diameter and applying the adhesive 30 only around the outer perimeter of the opposite face 22 in a donut fashion, so that the dimpling effect occurs only in the base 20 but not in the attached panel 12. The flexure in the base 20 and the donut shape of the adhesive 30 do not allow the dimpling of the attached panel 12 when secured to an attachment device 14.

In applying the stud assembly 10 to the decorator panel 12 which is supported on the interior wall portion of the aircraft, the adhesive 30 is pressed against the side of the panel 12 away from the interior of the aircraft at a position, spaced so that, said threaded shank 16 is received in said opening 32. When the stud assembly is bonded to the panel 12 and the panel supported on the attachment device 14, and when the nut 28 is run on the shank 16 to lock the panel to the attachment device, a dimpling effect occurs only in the base 20 and not in the panel 12.

What is claimed is:

1. A stud assembly for securing a nonstructural panel to an attachment device comprising:
    a base member having an upper and a lower surface;
    a threaded shank fixedly attached perpendicular to said upper surface of said base member, said threaded shank insertable through an aperture in the attachment device,
    an adhesive means disposed around the outer perimeter of said base member on said lower surface of said base member while leaving the central portion free of adhesive for holding and securing the stud assembly to the nonstructural panel, and
    a nut means rotatable along said threaded shank to cause movement of said shank in an axial direction away from the nonstructural panel when said nut is tightened whereby said base member central portion is resiliently deformed without deforming the nonstructural panel.

2. A stud assembly as recited in claim 1, wherein a plurality of ribs are disposed on the portion of said base member free from said adhesive means for adding stiffness to said base member.

3. A method of securing a nonstructural panel to an attachment device comprising the steps of:
    adhesively bonding a stud assembly to one surface of the panel, said stud assembly having a deformable base member with an upper and a lower surface, a threaded shank fixedly attached to said upper surface of said deformable base member, and said adhesive is applied to said lower surface of said base member, around the outer perimeter of said lower surface while leaving the central portion free of adhesive,
    inserting said threaded shank through an aperture in the attachment device said lower surface of said base member having said central portion concentric with said aperture which is free of said adhesive, and
    applying a nut member to said threaded stud whereby said concentric portion of said base member is forced axially into said aperture, with the nonstructural panel remaining free from indentations.

* * * * *